United States Patent [19]

Dohogne

[11] 4,281,234
[45] Jul. 28, 1981

[54] METHOD OF INDUCTION ANNEALING SQUIRREL CAGE ROTORS

[75] Inventor: L. Ranney Dohogne, St. Louis, Mo.

[73] Assignee: Emerson Electric Co., St. Louis, Mo.

[21] Appl. No.: 31,772

[22] Filed: Apr. 20, 1979

[51] Int. Cl.$^3$ .................. H05B 6/06; H02K 15/02
[52] U.S. Cl. ........................ 219/10.43; 219/10.57; 219/10.79; 148/108; 148/121; 310/211; 29/598
[58] Field of Search ............... 219/10.41, 10.43, 10.79, 219/10.57, 10.71, 10.69, 9.5, 7.5, 6.5, 10.75; 310/211; 29/598; 148/103, 108, 121, 150

[56] References Cited

U.S. PATENT DOCUMENTS

| | | | |
|---|---|---|---|
| 2,368,809 | 2/1945 | Denneen et al. | 219/10.57 |
| 3,093,888 | 6/1963 | Huguley | 310/211 X |
| 3,187,155 | 6/1965 | Beckert et al. | 219/10.75 |
| 3,612,925 | 10/1971 | Swanke | 310/211 X |
| 3,965,321 | 6/1976 | Brinkmann et al. | 219/10.41 |
| 4,082,936 | 4/1978 | Aoki et al. | 219/10.41 |

Primary Examiner—Thomas J. Kozma
Assistant Examiner—Philip H. Leung
Attorney, Agent, or Firm—Polster, Polster and Lucchesi

[57] ABSTRACT

Method of induction heating (annealing) the aluminum rotor cage of a squirrel cage rotor assembly so as to enhance the conductivity of the rotor cage with a consequent enhancement of the operating characteristics and efficiency of motors incorporating the annealed rotor. The rotor assembly is placed within a gap in the core of an induction heater transformer and is subjected to an alternating magnetic field which passes in generally radial direction through the body of the rotor assembly so as to induce a current in the rotor cage which resistance heats the rotor cage substantially independently of the steel laminations comprising the core of the rotor body. The rotor assembly being heat treated is rotated about its longitudinal axis so as to provide substantially uniform heating of the rotor cage.

6 Claims, 4 Drawing Figures

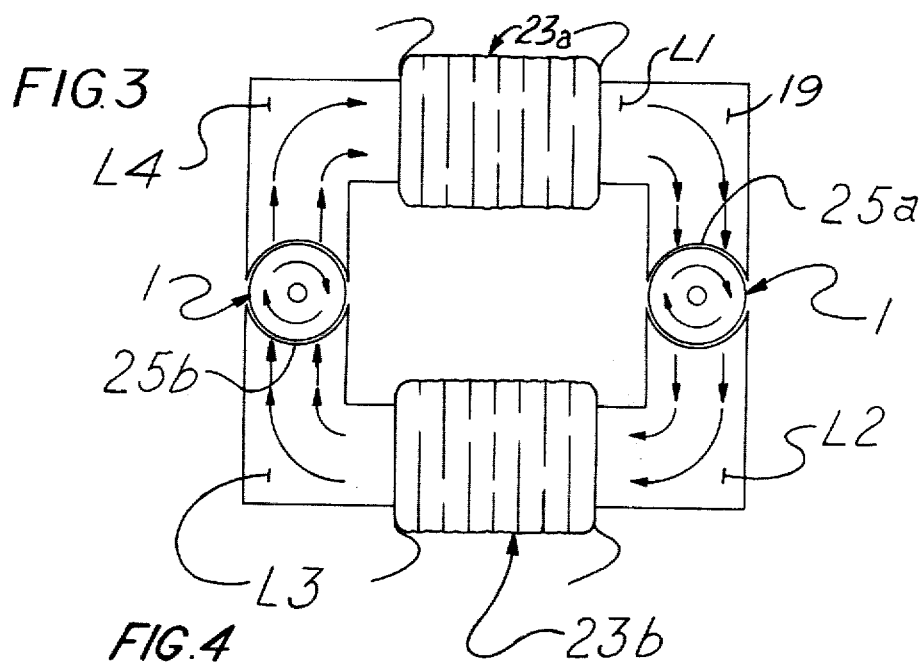
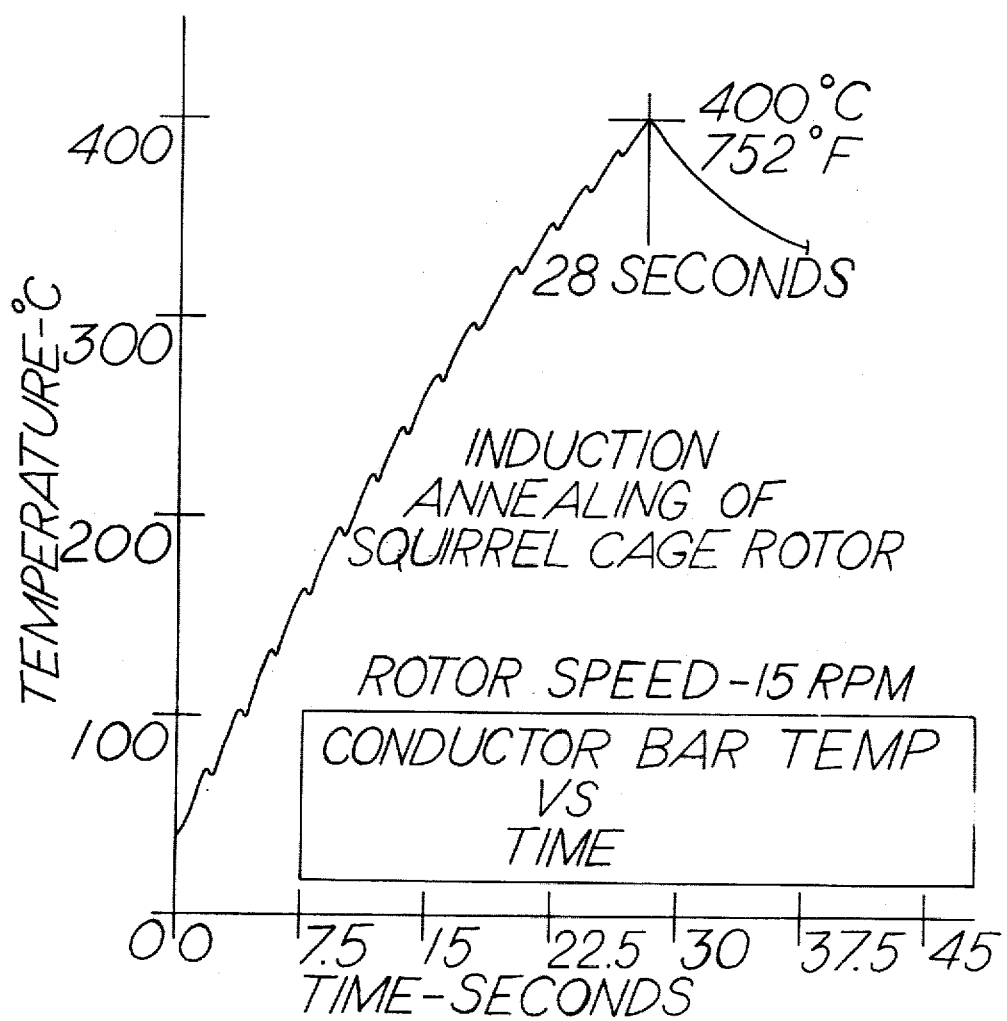

METHOD OF INDUCTION ANNEALING SQUIRREL CAGE ROTORS

BACKGROUND OF THE INVENTION

This invention relates to a method for the manufacture of electric motors, and more particularly to a method of induction annealing the rotor cage of squirrel cage rotor assemblies.

Generally, a squirrel cage rotor assembly for a fractional horse power alternating current motor includes a core constructed from a stack of generally circular laminations punched from suitable ferro-magnetic sheet material (e.g., a high magnetic permeability steel). Each of the laminations has a central opening and a plurality of notches arranged around the central opening near its outer margin. These laminations are assembled in a stack so as to form the rotor core with their central openings coaxial so as to form a rotor bore extending longitudinally through the core and with the notches arranged to form a number of slots extending longitudinally through the core. Preferably, the laminations are slightly angularly displaced (skewed) from one another so that the slots are not parallel to the central bore of the core, but rather are wrapped around the core in spiral fashion. The core is then placed in the die of a suitable die casting machine, and an aluminum alloy (preferably electric grade aluminum) is die cast around selected portions of the core. The molten aluminum is forced under pressure through the slots of the core so as to form conductor or rotor bars and so as to form suitable end rings which are cast-in-place on the end faces of the core so as to connect the ends of the conductor bars. In addition, cooling fan blades may optionally be integrally cast with the end rings. The die cast conductor or rotor bars and the end rings of a squirrel cage rotor are oftentimes collectively referred to as a rotor cage.

It has long been observed that by annealing "as cast" squirrel cage rotor assemblies, the conductivity of their rotor cages could be incrementally improved. Of course, the improved conductivity of the rotor cage results in an increase in virtually all of the operating characteristics of and the efficiency of a motor incorporating the rotor assembly. The reason for the annealing process enhancing the conductivity of the rotor assembly has not, to date, been clearly understood. Certain experts in the field have expressed the opinion that the annealing operation stress relieves the rotor cage thus improving its electrical conductivity. It is known that the electrical resistivity of aluminum is increased by cold working. For example, the conductivity of cold drawn aluminum wire is reported to be about 2% less than the same wire when thoroughly annealed (see page 2-27, Electrical Engineers' Handbook, Pender and Del Mar, 4th Edition, John Wiley and Sons, publishers). Others in the motor field have theorized that the improvement in conductivity of annealed rotor assemblies may be accounted for by the fact that upon heating of the rotor assembly in a heat treat furnace, the difference in thermal expansion of the aluminum conductor bars and the steel laminations of the core (e.g., 2.21 v. 0.55 watts cm$^2$ per degree per cm, respectively) resulted in an electrical separation of the rotor bars from the laminations thus reducing losses due to shorting through the steel laminations. Still others are of the opinion that the improvement in conductivity of the rotor cage observed by annealing the rotor is the result of metallurgical transformations of the aluminum. It is thought that by annealing the "as cast" aluminum rotor cages, certain metallurgical transformations occur (e.g., impurities in the aluminum may precipitate out of solid solution and grain growth is enhanced) which results in increased conductivity.

By the term annealing, it is herein meant that the specimens to be heat treated are held at an elevated temperature for a time sufficient to result in the above-noted increase in electrical conductivity.

Heretofore, squirrel cage rotors were conventionally annealed by placing them in a gas fired heat treat furnace and by allowing them to soak at the prescribed elevated temperature for a predetermined time. However, this process was relatively slow due to the fact that the rotors were heated only by convection and radiation heat transfer within the furnace. With this furnace heat treat method, not only was the die cast aluminum rotor cage heated, but also the laminations of the rotor assembly body which comprise a high percentage of the mass (and hence heat capacity) of the entire rotor body were also heated thus requiring a substantial time for heat treatment of the rotor assembly. Of course, these prior art furnace heat treating operations required a substantial amount of time during the manufacture of rotor assemblies and hence accounted for an appreciable fraction of the cost of manufacturing the rotor assemblies. Also, these prior furnace soak heat treating methods resulted in the wasting of considerable energy due to the inefficiencies of the heating of the rotor assemblies in the furnace and also due to the fact that the rotor core also had to be heated.

In addition to furnace annealing, rotors have heretofore been annealed by various induction heat treating processes. In general, these prior induction rotor heat treating processes utilized either a high frequency induction field (e.g., 1,000–3,000 Hz.) which, in certain instances, necessitated specialized and relatively expensive induction heating equipment, or which required induction heaters including a transformer with a primary winding energized by 60 Hz. line voltage and a water cooled secondary winding coupled to a suitable water cooled coil which heated the rotor assembly. Of course the necessity of providing specialized high frequency induction heating equipment required a substantial capital investment to utilize an induction heating system in the manufacture of rotor assemblies. However, in the prior transformer induction heating arrangements as above described, the requirement of a transformer with a water cooled secondary winding resulted in substantial heating inefficiencies such that the potential heating efficiency of the induction heating process was not realized.

SUMMARY OF THE INVENTION

Among the several objects and features of this invention may be noted the provision of a method or process of fabricating rotors of squirrel cage construction, such as above described, in which only the aluminum rotor cage of the rotor assembly is heated to a desired annealing or heat treat temperature;

the provision of such a method in which the heat treatment of the rotor cage is achieved in less time and with only a fraction of the energy required for prior furnace heat treat methods, and which is more energy efficient and requires simpler heating equipment than prior induction heat treat methods;

the provision of such a method which enables adhesives to be used to secure the rotor core to the shaft and further which enables these adhesives to be cured at a desired cure temperature contemporaneously with the heat treatment of the rotor cage;

the provision of such a method which may be readily adapted to treat rotors of various sizes and shapes, which speeds up production of rotor assemblies, which appreciably lowers the cost of rotor assemblies produced, and which does not require a substantial capital investment to incorporate the method of this invention in existing motor manufacturing assembly lines;

the provision of such a method in which the depth of the rotor body to be heated may be readily varied or controlled;

the provision of such a method in which all portions of the rotor cage are uniformly heated;

the provision of such a method which requires no work or load coil which does not require a high frequency (e.g., a frequency in excess of the line voltage frequency—60 Hz.) to heat the rotor assembly;

the provision of such a method which can readily heat treat rotors at speeds and rates required for actual production;

the provision of such a method in which heating of the rotor body may be readily controlled;

the provision of such a method which will rapidly heat the rotor cage to a predetermined temperature level;

the provision of such a method which efficiently utilizes the energy required for heat treatment of the rotor assembly; and the provision of such a method which substantially reduces the cost of annealing rotor assemblies over known prior art furnace and induction heating methods.

The method of this invention of fabricating squirrel cage rotor assemblies having enhanced electrical conductivity over "as cast" rotor assemblies will now be briefly described. These rotor assemblies have a core made of a stack of plate-like laminations of suitable ferro-magnetic material. The core has a central bore extending longitudinally therethrough for reception of a shaft or the like and a plurality of slots spaced around the central bore and extending lengthwise through the core. The rotor assembly further has conductor or rotor bars of aluminum or the like die-cast in place within the slots and end rings of die cast aluminum at the ends of the conductor bars on the outer face of the core integral with and interconnecting the conductor bars. The conductor bars and the end rings constitute a so-called rotor cage. More specifically, the method of this invention comprises placing a rotor within a gap of the core of an induction heating apparatus or transformer and then energizing the transformer with alternating current so as to generate an alternating magnetic field which passes generally radially through the body of the rotor so as to induce a flow of current therein and to effect resistance heating of the rotor cage. The rotor is then rotated about its longitudinal axis so as to insure uniform heating of the various conductor bars and end rings of its rotor cage.

Other objects and features of this invention will be in part apparent and in part pointed out hereinafter.

BRIEF DESCRIPTION OF THE DRAWINGS

FIG. 3 is a front elevational view of the induction heating apparatus shown in FIG. 2 illustrating the instantaneous direction of the lines of flux of the magnetic field flowing through the core of the induction heating apparatus; and FIG. 4 is a temperature vs. time plot of a conductor bar of a rotor cage being heated in accordance with the method of this invention.

Corresponding reference characters indicate corresponding parts throughout the several views of the drawings.

DESCRIPTION OF A PREFERRED EMBODIMENT

Figure 1:
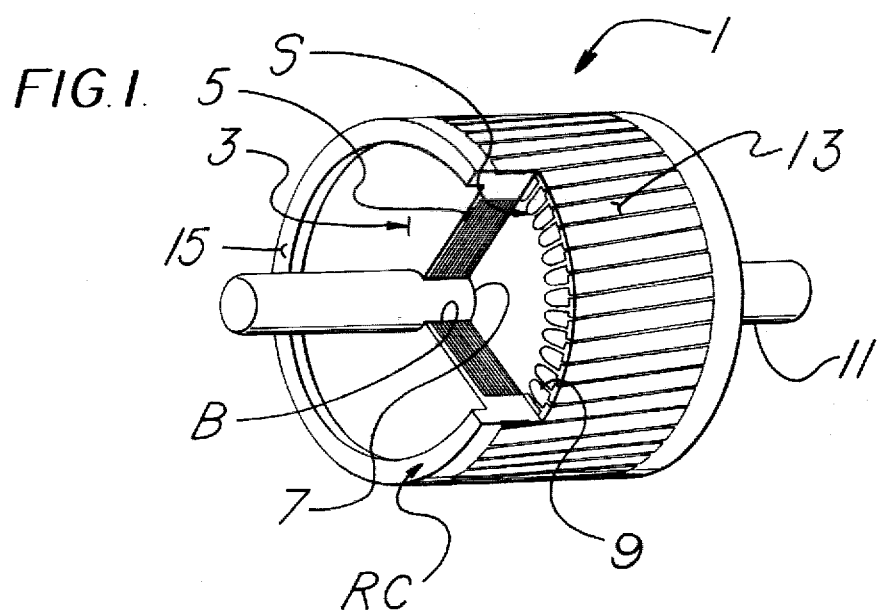
FIG. 1 is a perspective view of a typical squirrel cage rotor assembly having a portion of its rotor body broken away so as to illustrate the construction of the laminated core and the rotor cage of the rotor.

Referring now to the drawings, and more particularly to FIG. 1, a typical squirrel cage rotor assembly is indicated in its entirety by reference character 1. The rotor assembly is shown to include a rotor body having a core 3 comprised of a stack of laminations 5. The latter are circular plate-like members fabricated from suitable ferro-magnetic sheet material, such as a high magnetic permeability steel or the like. Each lamination 5 has a central opening 7 therethrough and a plurality of notches 9 formed in the outer margins thereof. The notches are generally spaced at equal angular intervals around the central opening. Upon assembling the stack to form the core, the central opening 7 of each lamination is arranged on a common axis (i.e., on the longitudinal center line of the rotor body) and thus the central openings form a central bore B extending longitudinally through the rotor. As shown in FIG. 1, the individual laminations comprising the core may each be slightly angularly displaced or skewed relative to one another such that their notches 9 form a series of slots S which extend generally longitudinally through the core but which are somewhat skewed relative to the longitudinal centerline of the rotor body so that the slots in essence spiral around the rotor body in helix fashion.

Rotor assembly 1 is further shown to include a rotor shaft 11 received in bore B and fixed to core 3 in any suitable manner, such as by shrink fitting or by adhesive bonding. While rotor assembly 1 is herein shown to include a rotor shaft, it will be understood that the provision of a rotor shaft in central bore B is not essential to carrying out the method of the present invention, as will be hereinafter set forth.

After assembly of core 3, as above described, the core is typically placed within the die of a die casting machine (not shown) and a molten aluminum, such as electrical grade aluminum, is injected under pressure into the die cavity so as to flow around selected portions of core 3. More specifically, the die casting die cavity is so shaped as to cause the molten aluminum to flow longitudinally through slots S and to form solid aluminum conductor or rotor bars 13 in each of the slots and so as to form end rings 15 on the end faces of core 3 integral with the ends of the conductor bars. Thus, rotor or conductor bars 13 and end rings 15 together form an integral rotor cage RC molded-in-place within core 3 with the end rings electrically short circuiting the ends of the conductor bars. Optionally, fan blades (not shown) may be simultaneously molded on the end rings.

The above-described rotor assembly 1 and method of fabricating the rotor assembly are conventional and therefore do not, per se, constitute a part of the method of this invention. Consequently, within the broader aspects of this invention, both the method of constructing and the structure of rotor assembly 1 can vary considerably from that herein described.

Upon the removal of rotor assembly 1 from the die casting machine and upon cooling, the die cast aluminum rotor cage RC assumes "as cast" condition. That is, certain residual stresses may remain in the die cast conductor bars 13 and end rings 15, the conductor bars may be in electrical contact with the portions of laminations 5 forming slots S, and the alloying elements or impurities in the aluminum rotor cage may be included in solid solution within the grain structure of the aluminum. Thus, any one or combination of the above-mentioned "as cast" characteristics of the rotor cage may have an adverse effect on the conductivity of the aluminum rotor cage. As heretofore noted, it has long been conventional to heat treat or anneal the rotor assembly to enhance the conductivity thereof by heating it to an elevated temperature, for example to about 400° C. (752° F.), or in other instances to about 482° C. (900° F.) to effect sufficient expansion of the rotor bore for heat shrinking as well as for annealing purposes.

Figure 2:
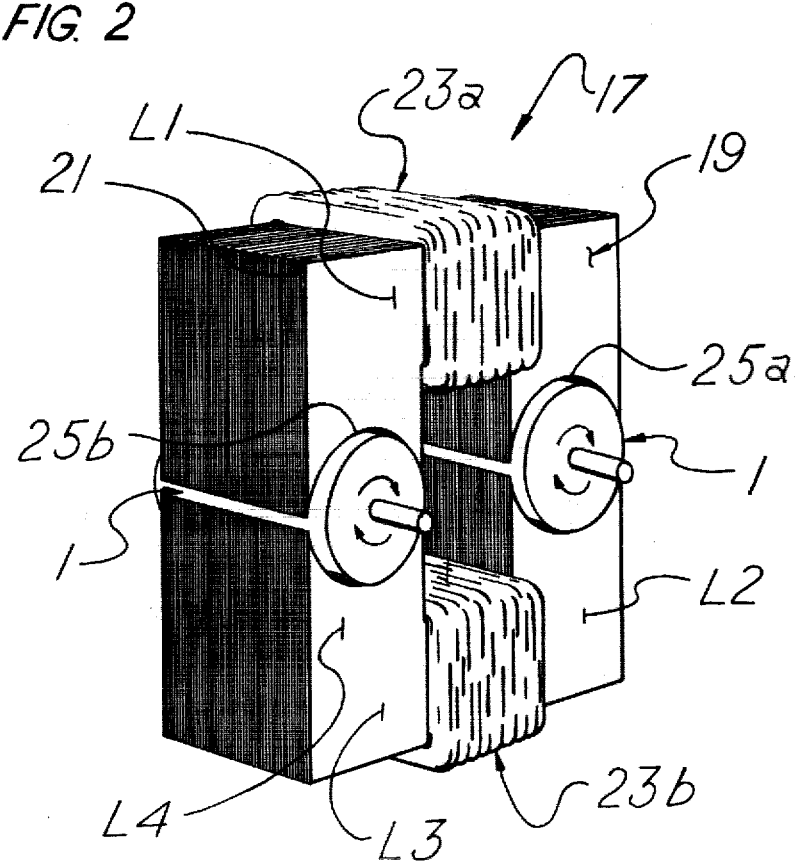
FIG. 2 is a diagrammatic perspective view of an induction heating apparatus (or transformer) for the simultaneously induction heating two rotor assemblies in accordance with the method of the present invention.

In accordance with the method of this invention, as will be hereinafter disclosed, rotor assemblies 1 are induction heated so as to heat only the aluminum rotor cages RC to a temperature sufficient to effect the conditioning or annealing of the aluminum from which the rotor cages are die cast. More specifically, a rotor assembly 1 is inserted (as will be hereinafter described) in an induction heating apparatus or transformer, as generally indicated at 17 (see FIGS. 2 and 3). This induction heating apparatus comprises, in essence, a single phase, core-type transformer having an iron core 19 made up of a stack of plate-like laminations 21 of suitable ferromagnetic material. Each of the laminations is generally rectangular having an inner opening and further having four legs, as designated L1, L2, L3 and L4. The core has a pair of coils 23a and 23b wound around opposite legs L1 and L3 of the core. The core is further designed to have a thickness of about the length of the rotor bodies to be annealed therein. Preferably, the core thickness is somewhat greater than the length of the rotor body to be heated.

In opposite legs L2 and L4 between coils 23a and 23b of the heating apparatus, respective circular-shaped gaps 25a and 25b are provided. These gaps are so sized as to closely, but yet loosely, receive a rotor assembly 1 to be annealed. Induction heater 17 further includes suitable means (not shown but which will be readily apparent to those skilled in the art) for rotatably supporting a rotor assembly 1 in each respective gap 25a or 25b and for rotating these rotor assemblies about their longitudinal axes within their gaps at a predetermined rate of rotation while the rotor assembly is undergoing induction heating. For example, this last-mentioned means could comprise a bearing cradle in which the bearing rollers supporting shaft 11 of a rotor assembly so as to permit a rotor assembly to be readily inserted in and removed from gaps 25a and 25b of the induction heating apparatus. Furthermore, these bearing rollers may be rotatably driven at a predetermined speed which may, of course, be varied so as to effect the rotation of the rotor assemblies supported thereby at a predetermined rotational rate.

Thus, the method of this invention involves placing at least one rotor assembly 1 to be annealed in a respective gap 25a or 25b in core 19 of induction heating apparatus 17. Then, coils 23a and 23b of the heating apparatus are energized with single phase, 60 Hz. alternating line current. This in turn causes the coils to generate a magnetic field in core 19 and the lines of flux of this field circulate through the core so as to couple the coils, as indicated by the arrows in FIG. 3. At gaps 25a and 25b, the lines of flux are shown to pass through the bodies of rotor assemblies 1 in a general radial direction. Thus, in essence, the rotor cages RC of the rotor assemblies inserted in gaps 25a and 25b function as single turn secondary coil of the transformer and have a secondary alternating current induced therein. The flow of this induced secondary current in the rotor cages of the rotor assemblies causes resistance heating of the rotor cage. More specifically, the flux field induces a secondary current in rotor or conductor bars 13 which flows through rotor bars 13 and end rings 15. This secondary induced current is greater in the rotor bars at the side of the rotor cage (as viewed in FIG. 3) than it is in the rotor bars at the top and bottom of the rotor cage. These currents are "summed" up in end rings 15 of the rotor and the current in the end rings is the greatest at the top and bottom thereof. As heretofore mentioned, the induction heating apparatus 17 includes means for rotating the rotors end gaps 23a, 23b about their longitudinal axes which the rotors are undergoing induction heating. This has the desired effect of uniformly and simultaneously heating all of the rotor bars and the end rings of the rotor cage.

It has been found that if the rotor assembly 1 is rotated at too slow a rate, the temperature of end rings 15 will become excessive and actual melting of the end rings could occur prior to certain of the rotor bars 13 attaining a desired annealing temperature. More specifically, it has been found that if the rotor assemblies are rotated at a rate of about 10 revolutions per minute or less, excessive end ring heating can result. It has also been found that an increase in rotational speed of the rotor assemblies enhances heating of laminations 5 in core 3. The reasons for this are not, at this time, clearly understood. It is, however, believed that by increasing the rotational speed of the rotor slows down the rate of induction heating of the rotor bars thereby to provide a longer time during which heat may be conducted from the rotor bars to the laminations. Thus, under certain desired heat treatments of the rotor assemblies, it may only be desirable to heat rotor cages RC. In these instances it is desirable that the rotor assemblies be rotated about their axes only as fast as is necessary so as to prevent overheating of end rings 15. Therefore, one variation of the method of this invention contemplates a step of rotating the rotor assemblies about their longitudinal axes at a rate of about 10 or more rpm so as to prevent excessive heating of the rotor cage. Even more preferably, the rotors may be rotated at a rate ranging between about 10–20 rpm so as to prevent unnecessary and undesirable heating of the rotor core. However, in still other variations of the method of this invention, it may be desirable to rotate the rotor assemblies somewhat faster so as to effect a desired amount of heating of their cores. This may be desirable in instances during which it is desired to heat the core to a desired temperature level, such as for curing an adhesive which, for example, may be used to bond the core laminations 5 together or which may be used to bond a rotor shaft 11 in place within bore B.

EXAMPLE

A test was conducted to determine if the method of the present invention for induction annealing of rotor assemblies would produce rotor assemblies of equivalent performance to rotor assemblies annealed by prior art gas-fired heat treat furnaces. In order to heat the rotors in a typical prior art gas-fired, heat treating furnace, an energy input of 2,333 BTU's was required for each rotor assembly annealed. In comparison with the induction heating method of the present invention, only 427 BTU's were required to anneal similar rotor assemblies. As a further comparison, other identical rotor assemblies were annealed utilizing prior art induction heating methods and a total energy input of approximately 900–1,000 BTU's per rotor was required. Thus, the method of this invention for heat treating rotor assemblies appears to require only about 18.3% of the energy input required for gas-fired heat treat furnaces and only about 42.7% of the energy input required for prior induction heat treating operations.

After two different groups of test rotors were annealed in gas fired heat treat furnace and by the induction heating method of the present invention, the test rotors were installed in stators and were bench tested to determine their breakdown, full load, and locked rotor torques and also to determine their no load current draws and no load wattage. As a basis of these tests, it was concluded that the induction heating method or process of the present invention gave enhanced motor performances just as good as did the prior art gas fired heating process. Surprisingly, the heat treating process of the present invention was carried out with less than one fifth of the energy required for the prior gas-fired heating process.

While core 19 of induction heating apparatus 17 was heretofore described as being made up of a stack of laminations 21, it will be understood that other core designs may be utilized or, in certain applications may be preferred.

In view of the above, it will be seen that the several objects and features of this invention are achieved and other advantageous results attained.

As various changes could be made in the above method or process without departing from the scope of the invention, it is intended that all matter contained in the above description or shown in the accompanying drawings shall be interpreted as illustrative and not in a limiting sense.

I claim:

1. The method of fabricating squirrel cage rotors having enhanced electrical conductivity over "as cast" rotors, said rotor having a core made of a stack of platelike laminations of suitable ferro-magnetic material, said core having a central longitudinal axis and a plurality of slots spaced around said central longitudinal axis proximate the outer surface of the core and extending substantially lengthwise through the core, said rotor having conductor bars of suitable aluminum material die cast in place within said slots and end rings of die cast aluminum at the ends of the conductor bars integral with and interconnecting the connector bars, said conductor bars and said end rings constituting a rotor cage, wherein the method of this invention comprises the steps of:

placing a rotor within a gap of the core of an induction heating apparatus;

energizing said induction heating apparatus with relatively low frequency alternating current so as to generate an alternating magnetic field which passes generally radially through said rotor and which induces heating of said conductor bars and end rings;

rotating said rotor about its longitudinal axis so as to ensure substantially uniform heating of the conductor bars and the end rings of its rotor cage; and continuing to energize said apparatus and to rotate said rotor thereby to heat said conductor bars and end rings to a temperature sufficient to enhance the electrical conductivity of said conductor bars and said end rings and so as to result in the heating of said core to a lower temperature.

2. The method of claim 1 wherein said induction heating apparatus is energized with 60 Hz. line voltage.

3. The method of claim 1 wherein said rotor is rotated at a rate in excess of about 10 revolutions per minute.

4. The method of claim 3 wherein said rotor is rotated at a rate ranging between about 10 and 20 revolutions per minute.

5. The method of claim 1 wherein said rotor is rotated at a rate sufficient to heat said rotor cage to a temperature sufficient to effect annealing thereof and also to heat said core so as to raise the temperature of the core to a predetermined temperature level.

6. The method of fabricating squirrel cage rotors having enhanced electrical conductivity over "as cast" rotors, said rotor having a core made of stack of platelike laminations of suitable ferro-magnetic material, said core having a central longitudinal axis, said axis being perpendicular to the planes of said laminations, and a plurality of slots proximate the outer surface of said core, said slots extending substantially lengthwise of the core, said rotor having conductor bars of suitable aluminum material die cast in place within said slots and end rings of die cast aluminum at the ends of the conductor bars integral with and interconnecting the conductor bars, said conductor bars and said end rings constituting a rotor cage, wherein the method of this invention comprises the steps of:

placing a rotor within a gap of the core of an induction heating apparatus;

energizing said induction heating apparatus with 60 Hz alternating current so as to generate an alternating magnetic field which passes generally radially through said rotor perpendicular to said rotor bars and substantially parallel to the planes of said laminations; and rotating said rotor about its longitudinal axis while said induction heating apparatus is energized so as to ensure uniform heating of the conductor bars and the end rings of its rotor cage and so as to minimize heating of said laminations.

* * * * *